United States Patent Office 3,169,825
Patented Feb. 16, 1965

3,169,825
REMOVAL OF VANADIUM FROM AQUEOUS SOLUTIONS
David W. Miller, Bartlesville, Okla., assignor to Phillips Petroleum Company, a corporation of Delaware
No Drawing. Filed Jan. 3, 1961, Ser. No. 80,043
3 Claims. (Cl. 23—19)

This invention relates to the removal of vanadium from aqueous solutions. In one aspect, it relates to the removal of soluble uranium values from aqueous basic solutions, such as the pregnant uranium-containing liquor obtained by the carbonate leaching of uranium ore, or the leach solution obtained by leaching roasted yellow cake comprising sodium diuranate. In another aspect, it relates to an improved process for obtaining a relatively pure yellow cake product having a low vanadium content. In a further aspect, it relates to the preparation of a novel substrate or contact material for removing vanadium values from aqueous solutions.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of an excess of caustic, such as sodium hydroxide. This addition of sodium hydroxide neutralizes the bicarbonate present and then causes the soluble uranium values to precipitate as sodium diuranate (this precipitate commonly called "yellow cake"). The solution containing the precipitated yellow cake is then thickened and separated, for example by filtering the thickened solution in a rotary filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Other metals and nonmetals are commonly associated with uranium-bearing material. The principal metal commonly associated with uranium-bearing materials is vanadium, although other metals such as zirconium, iron, titanium, barium, aluminum, silicon, antimony, and cobalt, and nonmetallic elements such as phosphorus are commonly associated with uranium-bearing materials. These other metals and nonmetals, especially vanadium, are commonly extracted with the uranium values in the carbonate leaching step and gradually build up in concentration in the process. For example, a typical secondary uranium ore such as coffinite will contain about 0.25 percent $U_3O_8$ and 0.1 percent $V_2O_5$, and during the leaching step about 10 to 20 percent of the vanadium present in the ore will also be leached. During the subsequent precipitation of the pregnant leach solution with caustic, some of the vanadium values present in the pregnant liquor will also be precipitated together with the uranium values, for example 40 to 60 percent of the $V_2O_5$ present in the pregnant liquor will precipitate with the yellow cake. In fact, up to 85 percent of the vanadium extracted from the ore may appear in the yellow cake produced. The other metals and nonmetals, present as impurities in the pregnant liquor, will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, a major purchaser of yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a price penalty if the vanadium content, expressed as $V_2O_5$, exceeds for example two weight percent of the $U_3O_8$ in the yellow cake, or the AEC may refuse to buy the yellow cake if the vanadium contaminant content is excessive. In many cases, the vanadium content of the yellow cake may be as high as 6 or 7 percent of the $U_3O_8$ content.

One method which has been proposed and used heretofore for purifying the yellow cake is that which involves heating or roasting the same with a high melting sodium salt, such as, sodium carbonate (M.P. 851° C.) or sodium chloride (M.P. 800.4° C.), sometimes together with sawdust, after which the roasted yellow cake is leached with water to dissolve the solubilized vanadium. The resulting slurry of insoluble, purified yellow cake and leach solution containing soluble vanadium values is then filtered to recover the purified yellow cake. The vanadium values present in the leach solution filtrate can then be recovered by acidifying the leach solution to precipitate the vanadium values as sodium hexametavanadate. While this roasting method, using the high melting sodium salt, has enjoyed some success, this method generally requires relatively high roasting temperatures on the order of 850° C. or higher, thus necessitating relatively high fuel costs and requiring frequent repairs of the roasting furnace. Another disadvantage of this roasting method resides in the fact that some of the uranium values are also solubilized, such solubilization consequently resulting in the loss of a small but valuable amount of the uranium values. For these reasons, and others, this roasting method, using relatively high roasting temperatures and high melting sodium salts, has not solved the need for an improved method of producing a purer yellow cake, or recovering vanadium values.

Accordingly, an object of this invention is to remove soluble vanadium values from aqueous solutions. Another object is to provide an improved method of removing soluble vanadium values from the pregnant uranium-containing liquor obtained by the carbonate leach of uranium ore. Another object is to provide an improved method of removing soluble vanadium values from the pregnant vanadium-containing liquor obtained by leaching roasted yellow cake. Another object is to provide an improved method for obtaining a relatively pure yellow cake product having a low vanadium content. Another object is to improve the recovery of uranium from uranium-bearing ores. Another object is to provide a novel substrate or contact material for removing soluble vanadium values from an aqueous solution. Other objects and advantages of this invention will become apparent to those skilled in the art from the following discussion and appended claims.

Briefly stated, in one of its broader aspects this invention provides a method whereby an aqueous solution containing soluble vanadium values, such as the pregnant liquor of the carbonate leaching process, is contacted with lead sulfate, lead carbonate, lead phosphate, or lead oxide deposited, coated, glued, or otherwise held on a permeable bed of an inert matrix made of aluminaceous and/or siliceous materials.

By contacting the aqueous solution containing soluble vanadium values with the substrate or bed containing insoluble lead oxide, lead sulfate, lead carbonate, or lead phosphate, such lead compound is converted to insoluble lead vanadate, which remains in or adheres to the "loaded" substrate. When the substrate becomes sufficiently loaded with lead vanadate, the vanadium values can be removed from the loaded substrate, for example, by contacting or eluting the same with an acid which will convert the vanadate anion to vanadic acid, such as aqueous sulfuric acid, aqueous sulfurous acid or aqueous phosphoric acid. The soluble vanadium values can then be recovered from the pregnant eluant, for example, by further acidifying the pregnant liquor to precipitate the soluble vanadium values as metavanadic acid, which acid can be melted and dehydrated to vanadium pentoxide.

Following the removal of the vanadium values from the loaded substrate, the latter can be regenerated and washed, if necessary. If sulfuric acid is employed to elute the vanadium values, this elution step may also serve as a regeneration step, while if sulfurous acid is used for purposes of elution, the elution step must be followed by treating the substrate with sulfuric acid or phosphoric acid. Where the insoluble lead compound initially deposited on the matrix is lead oxide or lead carbonate, and one of the aforementioned regeneration acids are used, the regenerated insoluble lead compound will be lead sulfate or lead phosphate. The concentration of the regeneration acid can vary and generally will be within the range of 1 and 15 N, while the total amount of regeneration acid employed should be in excess of that required for stoichiometric reaction with lead vanadate, generally from 5 to 50 times the amount required for reaction.

After regenerating the substrate by treating the same with sulfuric or phosphoric acid, it is desirable to wash the regenerated substrate, for example with water in the amount of 0.5 and 10 times per volume of acid employed for regeneration. It is also within the scope of this invention to employ a small amount of hydrogen peroxide in the wash water, e.g., 0.5 to 2 weight percent based on the water, the hydrogen peroxide aiding in obtaining a more complete regeneration.

The liquid permeable bed or substrate used in this invention can be prepared by depositing, coating, gluing, or otherwise holding the insoluble lead oxide or lead salts on the inert aluminaceous and/or siliceous matrix. Useful aluminaceous or siliceous materials, and combinations thereof, which can be used to form the matrix representatively include various forms of alumina and silica, and combinations thereof, such as corundum, bauxite, alundum, diatomaceous earths like kieselguhr, fuller's earth, firebrick, sillimanite, andalusite, porcelain, glass, and various clays such as kaolinite, halloysite, and allophanite, and the like. These materials can be ground and crushed to the desired size and used as such or the particulate material can be pelleted or otherwise agglomerated in particulate form, preferably so as to have a rough surface. The size and shape of the matrix particles can vary; they will be generally spherical with diameters ranging from $\frac{1}{16}$ inch to $\frac{1}{4}$ inch, although there is no hard and fast rule as to their dimensions. This particulate matrix material can be mixed with the insoluble lead oxide or lead salts in any desirable manner so as to deposit or otherwise coat these lead compounds on the surface of the particulate matrix material. One useful way to accomplish this is to mix or otherwise contact the particulate matrix material with a suitable adhesive and thereafter contact the adhesive-coated particulate matrix material with the dry, particulate insoluble lead compound. Any adhesive which is inert with respect to the vanadium-containing aqueous solutions, elution solutions, and regeneration acids can be used for this purpose, including adhesives such as lower molecular weight polymers of styrene and isobutylene, epoxy resins, cellulose esters, phenolic resins, polyester resins, and the like. The adhesive can be applied to the matrix material by spraying, dipping, and like procedures. The adhesive can be dissolved in a suitable solvent before admixture with the particulate matrix material and the solvent thereafter removed by evaporation or the like from the adhesive-coated matrix material. The amount of the insoluble lead salt which is deposited on the particulate matrix can vary and here, too, no hard and fast rule will be set. Generally, for most applications the substrate can contain from 2 to 100 grams of the insoluble lead compound per gram of matrix material. The bed or column of the novel substrate used in this invention can vary in density, but it should be understood that it is sufficiently permeable to allow the aqueous vanadium-containing solution and other solutions used to pass or percolate through the substrate.

The substrate containing the water-insoluble lead oxide or lead salt can be employed to remove the vanadium values from any aqueous solution, such as the pregnant liquor of the carbonate leaching process, barren carbonate leaching liquor from this process, and the leach liquor from the leaching of roasted yellow cake. Where all or the desired amount of vanadium values are not removed by a single pass through the substrate, that effluent which does pass through the substrate can be recycled and passed one or more times again through the substrate. The vanadium values present in these aqueous solutions can be removed by either batch-wise operations or semi-continuous operations using two or more beds of the permeable substrate containing the lead compound. It will be often advantageous to use two or more beds of the substrate in parallel and switch from one bed to a fresh bed when 60–80 percent of the bed is theoretically loaded with lead vanadate.

Where the aqueous vanadium-containing solutions contain soluble uranium values, such as in the case of the pregnant liquor obtained by the carbonate leaching of uranium ore, the novel substrate of this invention selectively and preferentially removes the vanadium values without removing the uranium values. Following removal of the vanadium values, the pregnant liquor can be precipitated with caustic to yield a purer yellow cake product with a low $V_2O_5$ content.

Depending upon which insoluble lead compound is used, from about 3.7 to about 5 grams of the insoluble lead oxide, lead sulfate, lead phosphate, or lead carbonate will react with 1 gram of $V_2O_5$; thus the amount of aqueous, vanadium-containing solution which can be treated with the novel substrate of this invention will depend upon the particular insoluble lead compound used, the amount of the insoluble lead compound present in the substrate, the concentration of the $V_2O_5$ in the aqueous solution, and the total amount of substrate.

Generally, the aqueous solutions to be treated according to this invention will contain from about 0.2 to 60 grams of $V_2O_5$ per liter. Ordinarily, the pregnant uranium-containing liquor obtained from the carbonate leaching process will contain from 0.2 to 20 grams of $V_2O_5$ per liter, and the leach solution obtained by the roasted yellow cake will contain from 0.2 to 40 grams of $V_2O_5$ per liter. A gram of substrate containing from 2 to 100 grams of lead oxide, lead sulfate, lead carbonate, or lead phosphate will be contacted with from about 0.2 to 2 liter of aqueous vanadium-containing solution for theoretical loading, or 0.1 to 0.8 liter for 80 percent loading.

The following examples further illustrate the objects and advantages of this invention, but it should be understood that these examples and the various amounts, materials, and other conditions recited in these examples should not be construed to unduly limit this invention.

Particulate alumina was mixed with a solution of a polystyrene adhesive (Duco Cement) in acetone. The excess solution was decanted and the resulting adhesive-coated alumina particles were tumbled with particulate lead oxide (sublimed litharge). The resulting lead oxide-ciated alumina pellets were then dried overnight and packed into a column containing water. Pregnant liquor from a carbonate leach process containing 0.35 g./l. $V_2O_5$, 26.71 g./l. $Na_2CO_3$, 12.93 g./l. $NaHCO_3$, and approximately 2 g./l. $U_3O_8$, was passed through the packed column in successive 100 ml. batches. The time required for each batch of pregnant liquor to pass through the column was measured and the $V_2O_5$ content of each effluent was determined by colorimetric analysis. Results of these runs are expressed below in Table I.

*Table I*

| Batch of pregnant liquor | Time for pregnant liquor to pass thru column, min. | Amt. of $V_2O_5$ in effluent, g./l. |
|---|---|---|
| 1 | 8 | 0.093 |
| 2 | 13 | 0.047 |
| 3 | 14 | 0.057 |
| 4 | 5 | 0.137 |
| 5 | 5 | 0.210 |
| 6 | 46 | 0.075 |
| 7 | 32 | 0.065 |
| 8 | 18 | 0.125 |
| 9 | 36 | 0.076 |
| 10 | 31 | 0.125 |

The date of Table I indicates that the novel substrate of this invention is indeed effective in removing soluble vanadium values from aqueous solutions containing the same. The vanadium loaded bed is then eluted 5 N aqueous sulfuric acid, whereby the vanadium values are removed from the bed and the lead compound in the bed is converted to lead sulfate. The regenerated bed is washed and used to remove vanadium values from further batches of aqueous solution containing the same in the manner described.

Various modifications and alterations of this invention will become apparent to those skilled in the art, without departing from the scope and spirit of this invention, and it should be understood that this invention is not to be unduly limited to that set forth herein for illustrative purposes.

I claim:

1. A method of recovering soluble vanadium values from an aqueous basic solution containing the same, which comprises passing said solution through a liquid-permeable bed comprising a particulate matrix material selected from the group consisting of aluminaceous and siliceous materials, and mixtures thereof; coated with an adhesive selected from the group consisting of polystyrene, polyisobutylene, epoxy resins, cellulose esters, phenolic resins and polyester resins; and with an insoluble lead salt selected from the group consisting of lead oxide, lead sulfate, lead phosphate and lead carbonate deposited thereon; and eluting vanadium values from the resulting lead vanadate-loaded bed by passing an acid eluting agent through said loaded bed.

2. A method according to claim 1 wherein said acid eluting agent is selected from the group consisting of sulfuric acid and sulfurous acid.

3. A method according to claim 2 wherein said acid eluting agent is sulfurous acid, and said bed is regenerated after said vanadium values are removed by passing a regeneration liquid through said bed selected from the group consisting of sulfuric and phosphoric acid.

References Cited in the file of this patent

UNITED STATES PATENTS

| 1,129,029 | Vogt | Feb. 16, 1915 |
| 2,340,110 | D'Alelio | Jan. 25, 1944 |
| 2,442,429 | Nye et al. | June 1, 1948 |
| 2,583,591 | Perrin et al. | Jan. 29, 1952 |
| 2,654,653 | Nye et al. | Oct. 6, 1953 |
| 2,855,269 | Boyd et al. | Oct. 7, 1958 |
| 2,937,074 | Abrams | May 17, 1960 |

OTHER REFERENCES

Nuclear Science Abstracts, vol. 11, No. 990, January 31, 1957, which reports AEC Document RMO–2619 to Clifford et al., June 1955.